US012438274B1

(12) United States Patent
Lafleur et al.

(10) Patent No.: US 12,438,274 B1
(45) Date of Patent: Oct. 7, 2025

(54) LTE ANTENNA AND BACKER PLATE ASSEMBLY

(71) Applicant: ORBCOMM, INC., Rochelle Park, NJ (US)

(72) Inventors: Phil Lafleur, Ontario (CA); Ronald Straz, Annadale, VA (US)

(73) Assignee: ORBCOMM INC., Sterling, VA (US)

( * ) Notice: Subject to any disclaimer, the term of this patent is extended or adjusted under 35 U.S.C. 154(b) by 109 days.

(21) Appl. No.: 18/401,624

(22) Filed: Dec. 31, 2023

Related U.S. Application Data

(60) Provisional application No. 63/478,141, filed on Dec. 31, 2022.

(51) Int. Cl.
*H01Q 1/24* (2006.01)
*G06Q 10/0833* (2023.01)
*H01Q 9/04* (2006.01)

(52) U.S. Cl.
CPC ....... *H01Q 9/0407* (2013.01); *G06Q 10/0833* (2013.01)

(58) Field of Classification Search
CPC .. H01Q 1/28; H01Q 1/32; H01Q 1/38; H01Q 1/24; H01Q 9/0407; H01Q 21/00; H01Q 21/065
See application file for complete search history.

(56) References Cited

U.S. PATENT DOCUMENTS

| | | | | |
|---|---|---|---|---|
| 5,927,654 | A * | 7/1999 | Foley | H01Q 1/28 244/172.6 |
| 9,966,658 | B2 * | 5/2018 | Fitz-Coy | B64G 1/66 |

* cited by examiner

*Primary Examiner* — Hasan Islam

(57) ABSTRACT

An improved cargo tracking device which includes a main housing unit which can be secured to a roof or wall of a given cargo container using securing wings. The main housing of the tracking device of the present invention may preferably include a patch antenna and a front face/surface which extends out from the main horizontal plane of the tracking device and which includes an opening for the insertion/attachment of a solar panel array. According to further preferred embodiments, the solar panel of the present invention may preferably be electrically connected to the main circuit board via one or more electronic chokes which are preferably tuned to remove selected RF frequencies transmitted/received by the patch antenna.

1 Claim, 12 Drawing Sheets

LTE ANTENNA AND BACKER PLATE ASSEMBLY

RELATED APPLICATIONS

The present application claims priority to U.S. Provisional Application No. 63/478,141 filed Dec. 31, 2022.

BACKGROUND AND FIELD OF THE PRESENT INVENTION

Field of the Present Invention

The present invention relates generally to a cargo tracker data transmission system. More specifically, the present invention relates to a system, method and apparatus for enhancing transmission and receiving efficiencies for LTE patch antennas and the like within cargo tracking devices.

BACKGROUND OF THE INVENTION

Cargo tracking sensors are effective at monitoring the location of individual containers from point of origin to destination and maintaining an inventory of loaded and empty containers. Most of these systems rely on transponders mounted on the containers that send messages to satellites or ground stations, from which the messages are rerouted to shipping companies, freight forwarders, and companies. For example, U.S. Pat. No. 5,565,858, provides a device external to the shipping container which communicates using a combination of a short range transceiver and a long range transceiver. European Patent Application No. EP 1246094 also describes a communication system external to the container which allows for tracking the movement of the container. This application also describes the use of a satellite positioning unit.

Cargo container monitoring and security devices are incorporated into new cargo container models and/or retrofitted into existing models. Virtually all of these systems include some variation of an external data transmitter attached to a corrugated container surface. Such systems contain multiple modes of communication for various purposes including, short range wireless such as Bluetooth or 802.11 Wi-Fi, cellular, or satellite connections.

Since tracking devices can be damaged during transport, the attached devices are commonly designed to fit within the depressed corrugated areas of the shipping container surfaces for protection. However, when fitted within such corrugated areas, the ability to transmit radio signals and to receive solar power radiation are affected. In particular, when a tracking device attempts to transmit data via an internal patch antenna or the like, the radiation patterns are negatively impacted due to standing waves created between the device transmitter and the shipping container surfaces. Since the proper operation of the communications devices of these systems is critical, there is a strong need for an antenna assembly which removes the interfering radiation patterns.

SUMMARY OF THE PRESENT INVENTION

To address the shortcomings presented in the prior art, the present invention teaches an improved cargo tracking device which includes a main housing unit which can be secured to a roof or wall of a given cargo container as discussed further herein.

According to a preferred embodiment, the tracking device of the present invention may preferably include a main housing which may be secured to the container surface using securing wings. According to a further preferred embodiment, the main housing of the tracking device of the present invention may preferably include a front face/surface having an opening for the insertion/attachment of a solar panel array. Preferably, the front face/surface may preferably extend out from the main horizontal plane of the tracking device. Accordingly, the front face/surface may preferably be orientated at an angle which is off-set from the main vertical plane of the main housing by an angle which may be in the range of 10°-80°. According to a preferred embodiment, the front face/surface may be off-set by an angle in the range of 30°-60°. According to a still further preferred embodiment, the front face/surface may be off-set by an angle in the range of 40°-50°.

According to further preferred embodiments, the exemplary vehicle tracking device of the present invention may preferably enclose internal components which may include a main circuit board, a patch antenna, an internal battery which is electrically connected to the main circuit board and a backer plate assembly. According to a further preferred embodiment, the backer plate assembly of the present invention may preferably be attached to the main circuit board via one or more securing pins.

According to further preferred embodiments, the solar panel of the present invention may preferably be electrically connected to the main circuit board via one or more electronic chokes which are preferably tuned to remove selected RF frequencies transmitted/received by the patch antenna.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

DETAILED DESCRIPTION OF THE PREFERRED EMBODIMENTS

Figure 1:
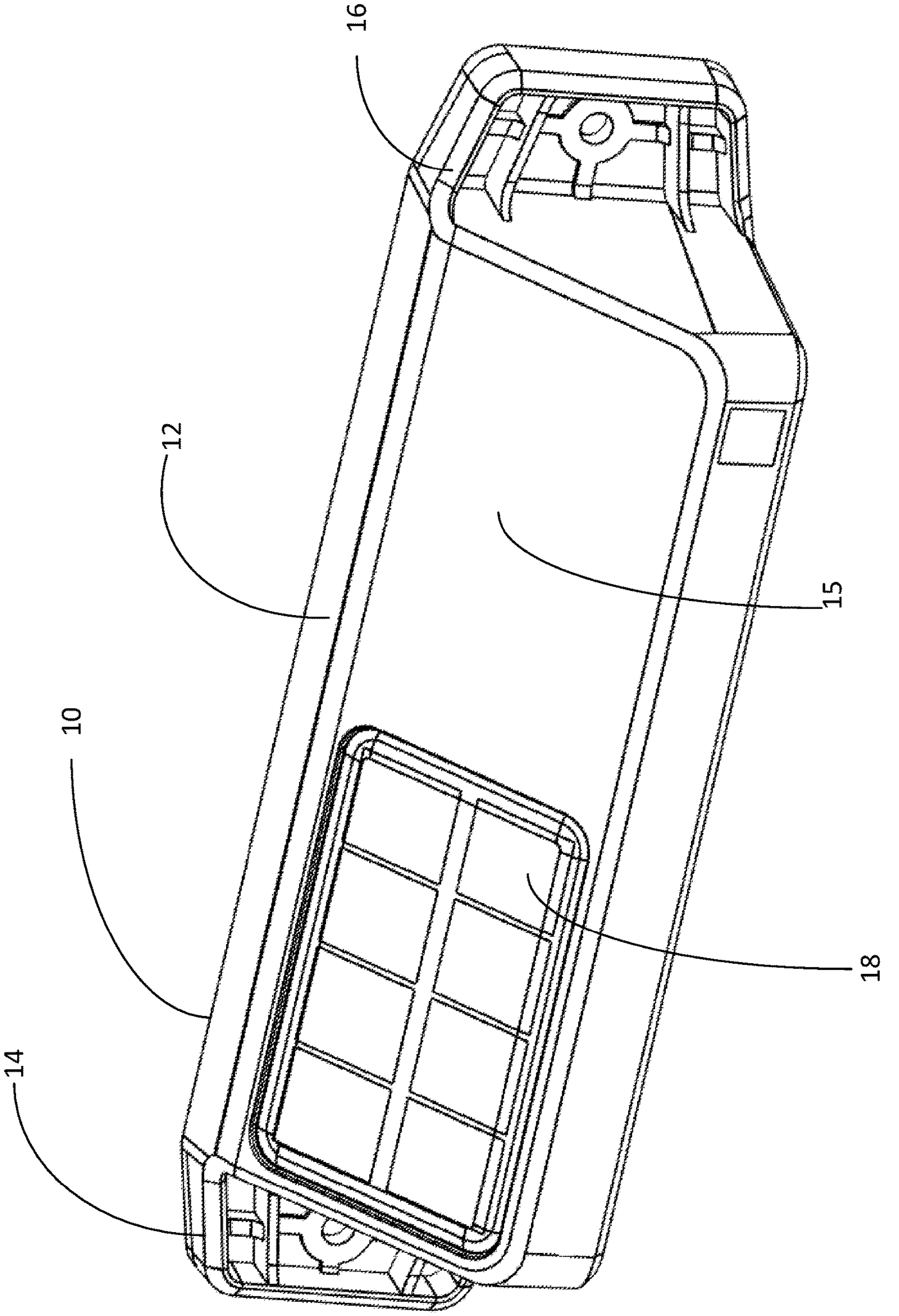
FIG. 1 is a perspective view of an exemplary vehicle tracking device in accordance with a first preferred embodiment of the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art. The descriptions, embodiments and figures used are not to be taken as limiting the scope of the claims.

Where the specification describes advantages of an embodiment or limitations of other prior art, the applicant does not intend to disclaim or disavow any potential embodiments covered by the appended claims unless the applicant specifically states that it is "hereby disclaiming or disavowing" potential claim scope. Moreover, the terms "embodiments of the invention", "embodiments" or "invention" do not require that all embodiments of the invention include the discussed feature, advantage or mode of operation, nor that it does not incorporate aspects of the prior art which are sub-optimal or disadvantageous.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Additionally, any examples or illustrations given herein are not to be regarded in any way as restrictions on, limits to, or express definitions of, any term or terms with which they are utilized. Instead, these examples or illustrations are to be regarded as illustrative only.

As used herein, the singular forms "a", "an" and "the" are intended to include the plural forms as well, unless the context clearly indicates otherwise. Additionally, the word "may" is used in a permissive sense (i.e., meaning "having the potential to'), rather than the mandatory sense (i.e., meaning" must"). Further, it should also be understood that throughout this disclosure, unless logically required to be otherwise, where a process or method is shown or described, the steps of the method may be performed in any order (i.e., repetitively, iteratively, or simultaneously) and selected steps may be omitted. It will be further understood that the terms "comprises," "comprising," "includes" and/or "including", when used herein, specify the presence of stated features, integers, steps, operations, elements, and/or components, but do not preclude the presence or addition of one or more other features, integers, steps, operations, elements, components, and/or groups thereof.

The communication elements of the present invention as discussed below may include a wide variety of signal or data transmitting and receiving circuits, such as antennas, amplifiers, filters, mixers, oscillators, digital signal processors (DSPs), and the like whether illustrated or omitted.

With reference now to FIGS. 1-12, the present invention teaches a system, method and apparatus for enhancing transmission and receiving efficiencies for LTE patch antennas and the like within cargo tracking devices and the like. As should be understood, the examples discussed herein are intended to be illustrative and any of a variety of alternative systems, embodiments and/or configurations may be used with the present invention without limitation.

With reference now to FIGS. 1-5, simplified perspective views of an exemplary tracking device 10 in accordance with aspects of the present invention is provided. FIG. 1 is a perspective view of an exemplary vehicle tracking device in accordance with a first preferred embodiment of the present invention. As shown in FIG. 1, the present invention may include a tracking device 10 with a main housing unit 12 which can be secured to a roof or wall of a given cargo as discussed further herein. As shown, the tracking device 10 may preferably include the main housing 12 which may be secured to a container surface using exemplary securing wings 14, 16. As shown, the front face/surface 15 of the main housing 12 may include an opening for the insertion/attachment of a solar panel array 18. The front face/surface 15 may preferably extend out from the main horizontal plane of the tracking device 10. In this way, the front face/surface 15 may preferably be orientated at an angle which is off-set from the main vertical plane of the main housing 12 by an angle which may be in the range of 10°-80°. According to a preferred embodiment, the front face/surface 15 may be off-set by an angle in the range of 30°-60°. According to a still further preferred embodiment, the front face/surface 15 may be off-set by an angle in the range of 40°-50°.

Figure 2:
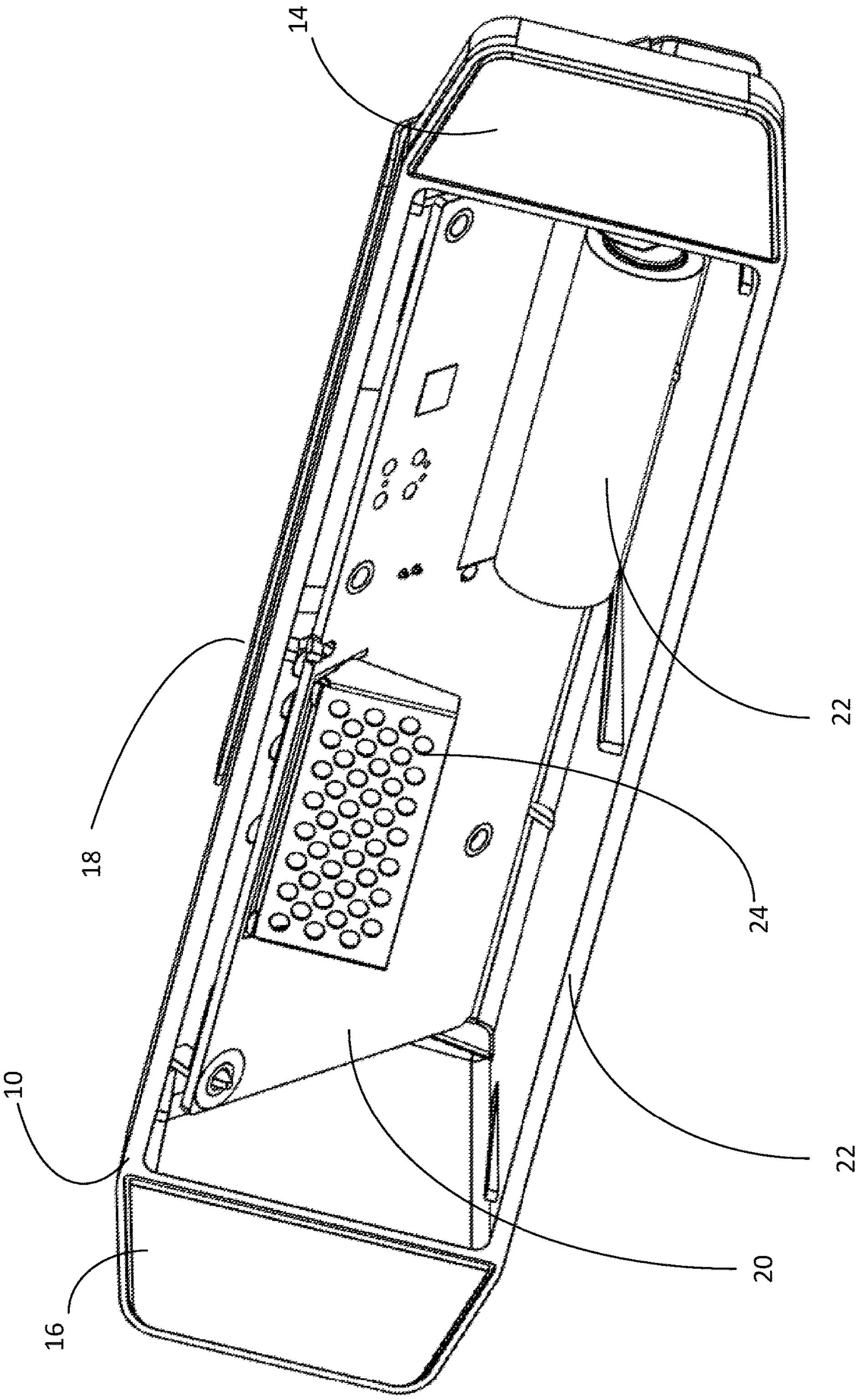
FIG. 2 is a simplified cut-away view of the exemplary vehicle tracking device shown in FIG. 1.
Figure 3:
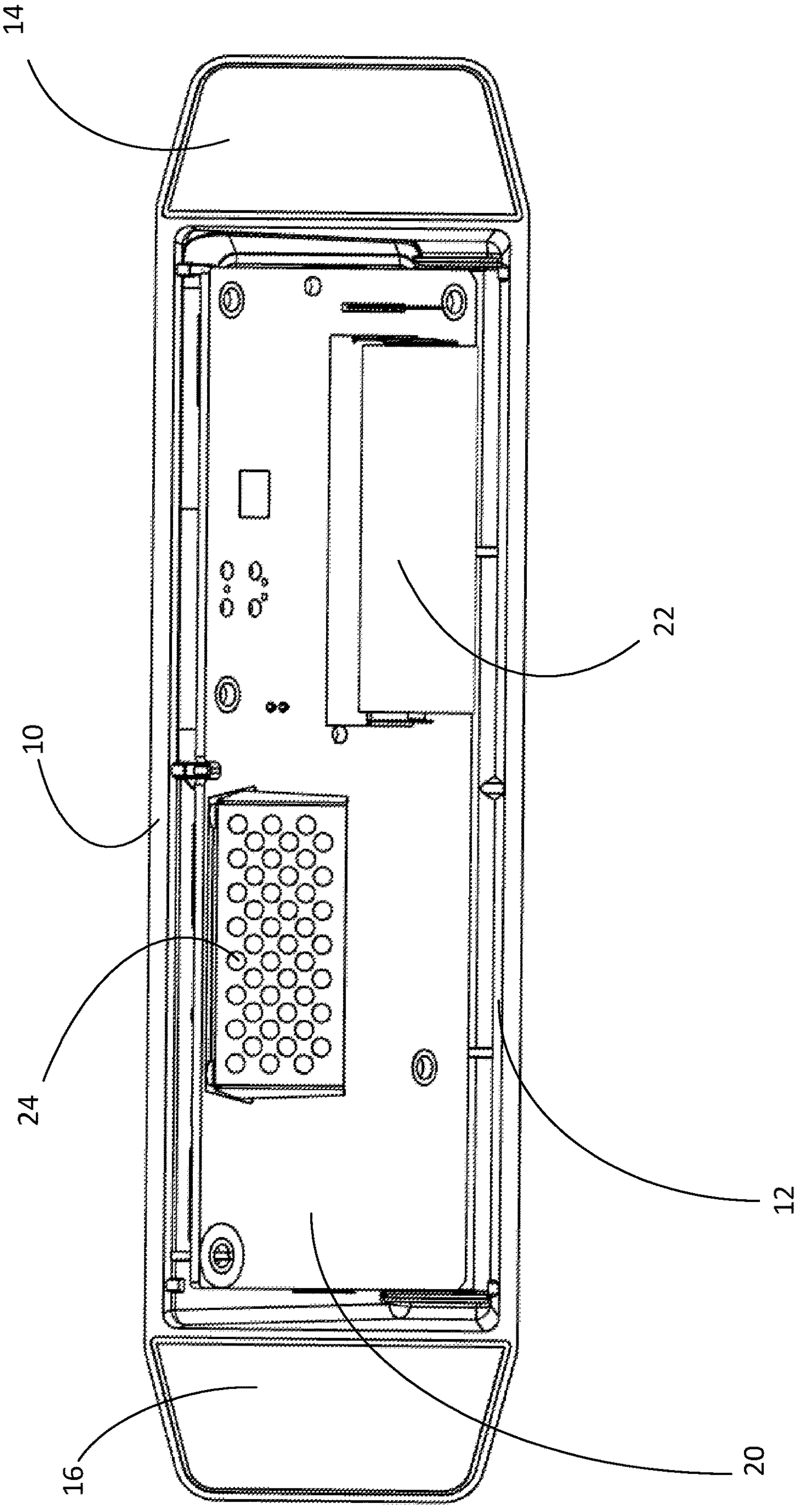
FIG. 3 is simplified elevation view of the image shown in FIG. 2.

Referring now to FIGS. 2-3, a simplified cut-away views of the back of the exemplary vehicle tracking device 10 shown in FIG. 1 are provided. As shown, the vehicle tracking device 10 may preferably enclose internal components which may include a main circuit board 20. The exemplary tracking device 10 may preferably further include a battery 22 which is electrically connected to the main circuit board. This battery may preferably be a rechargeable, lithium ion battery or the like.

Figure 4:
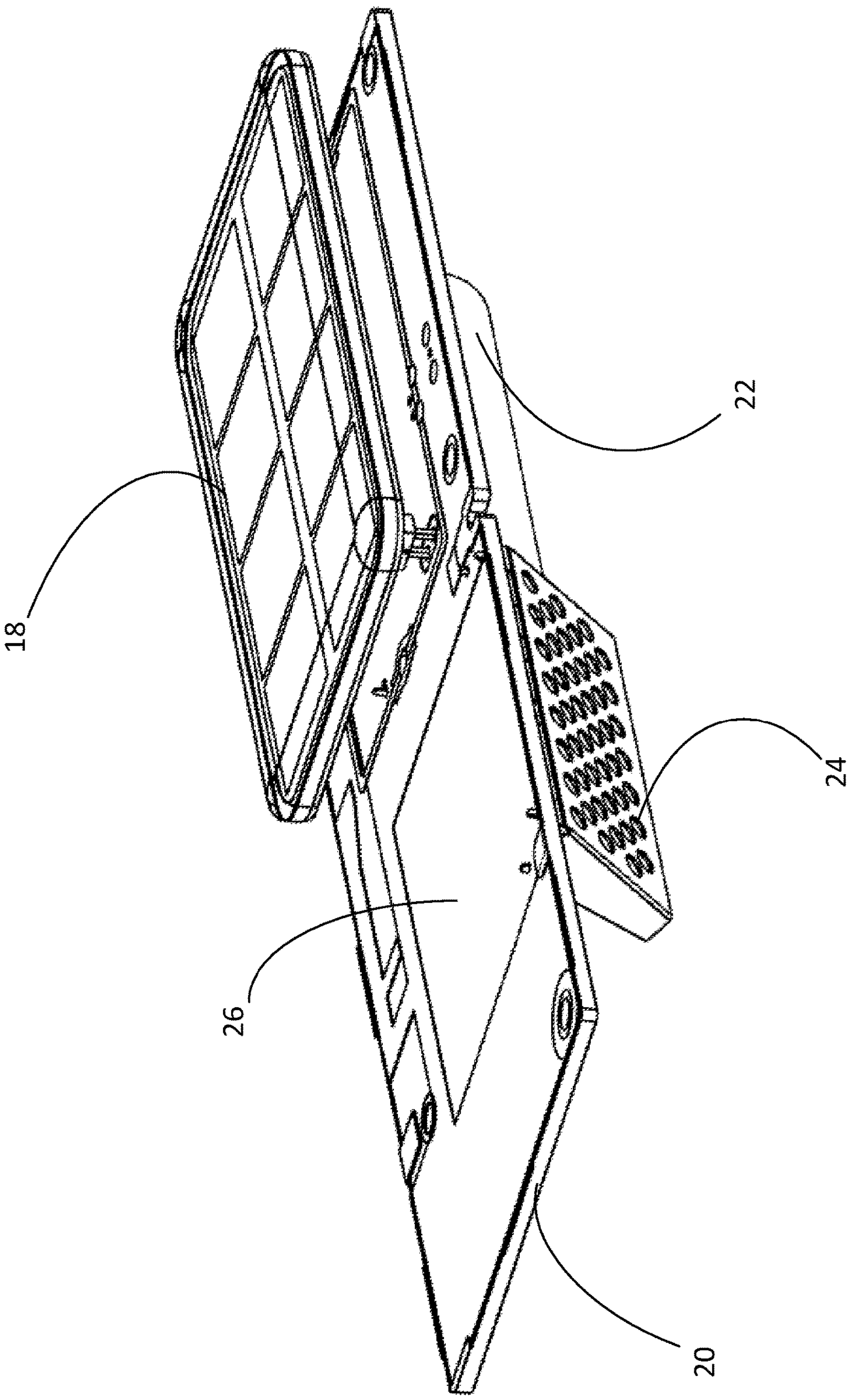
FIG. 4 is a perspective of exemplary interior elements of the exemplary tracking device shown in FIG. 1.
Figure 5:
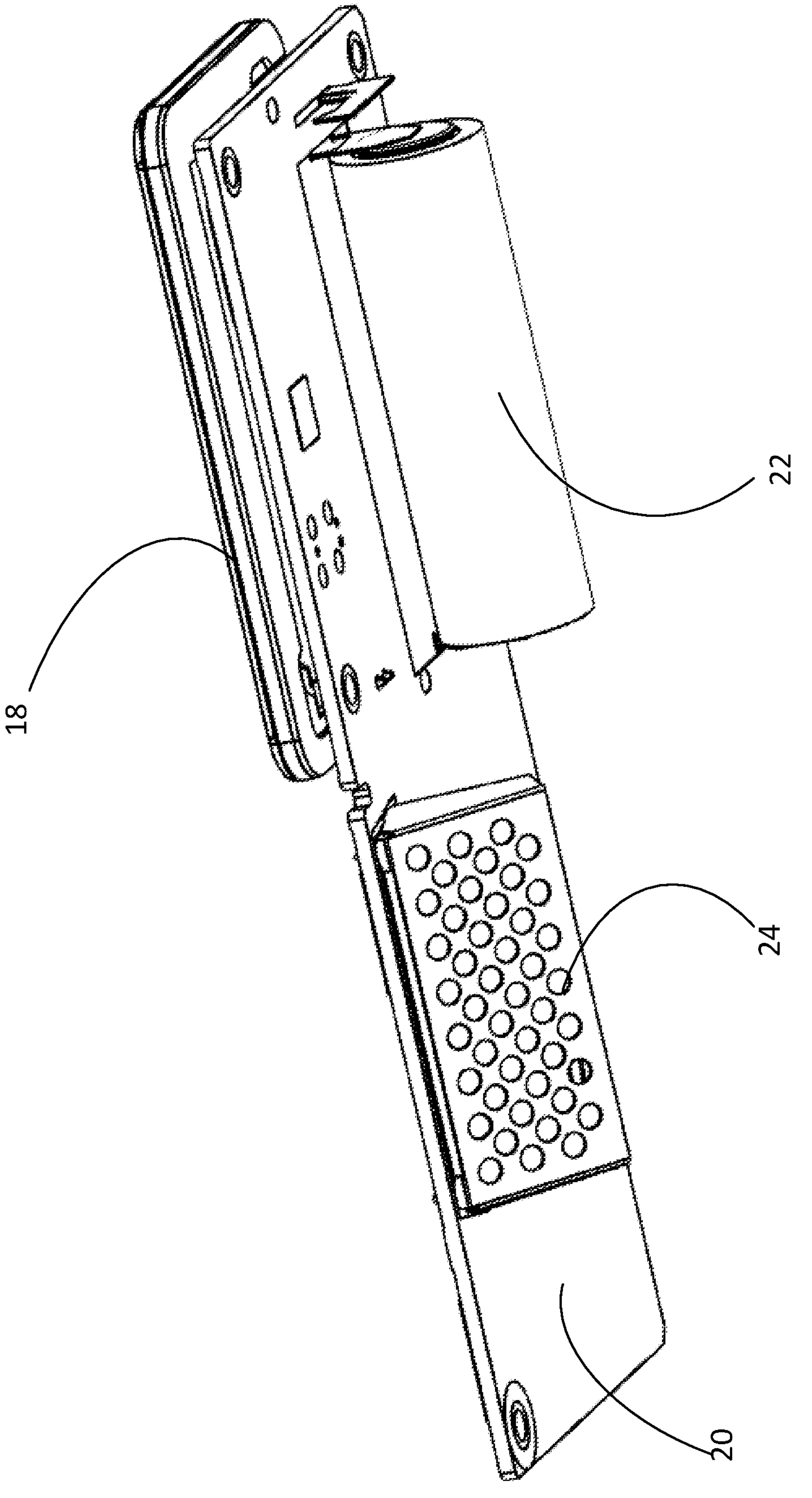
FIG. 5 is a bottom perspective view of the exemplary interior elements of the exemplary tracking device shown in FIG. 1.

As shown in FIGS. 2 and 3, the interior elements of the present invention may preferably further include a backer plate assembly 24. As shown, the backer plate assembly 24 is preferably attached to the main circuit board via one or more securing pins as discussed further below. FIGS. 4 and 5 provide further example views of the exemplary interior components independent of the main housing 12. In particular, the backer plate assembly 24 is shown attached to the patent antenna 26 integrated within the main circuit board 20.

Figure 6:
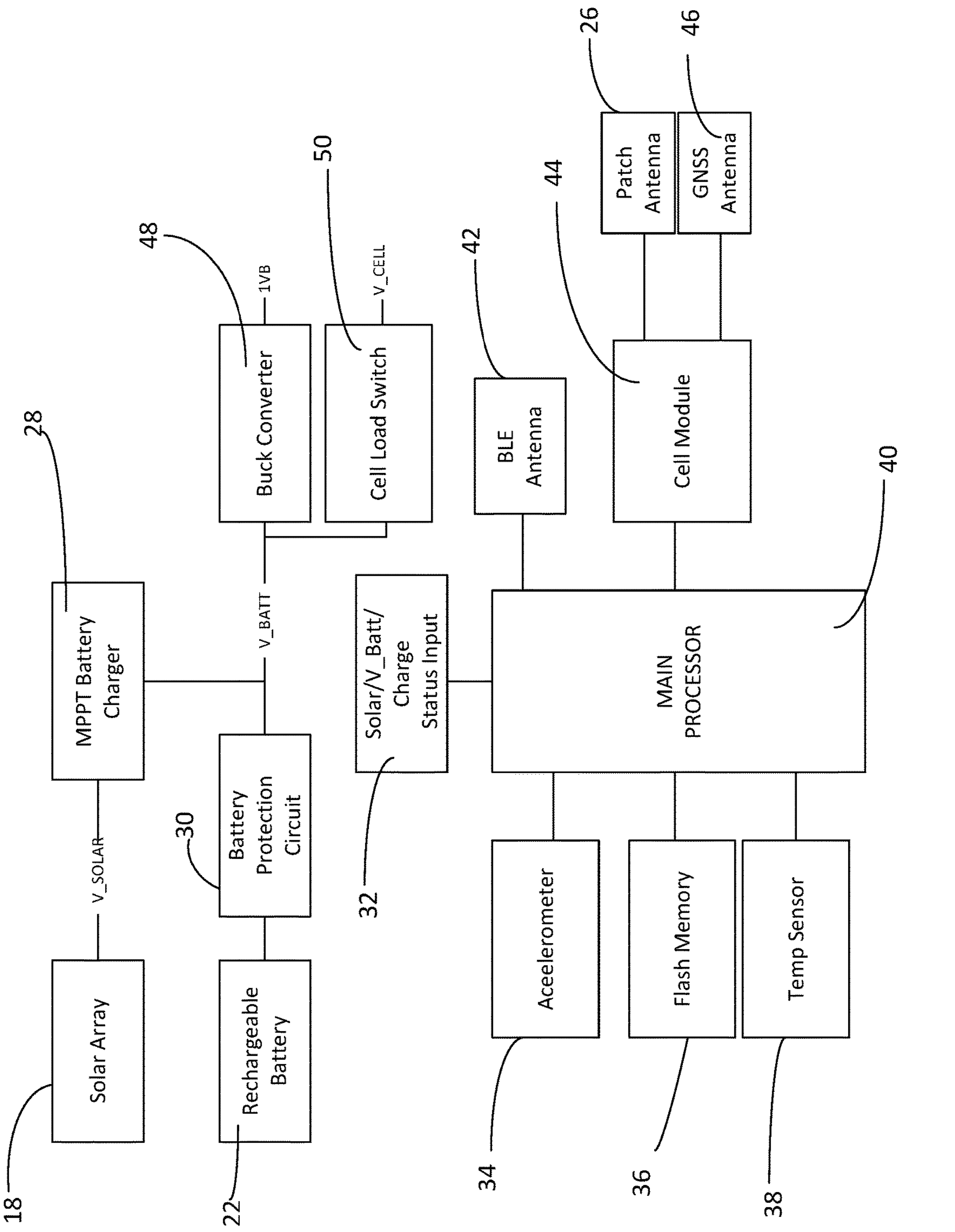
FIG. 6 is an exemplary is a functional diagram of an exemplary control system of the present invention.

FIG. 6 is an exemplary is a functional diagram of an exemplary control system of the present invention which includes selected elements connected to or integrated within the main circuit board 20. As shown, the main processor 40 of the present invention may preferably include links to sensors memory and power elements of the tracking device 10. As shown the main processor 40 is attached to an accelerometer 34. Additionally, the main processor 40 maybe attached to flash memory 36 and a temperature sensor 38. Other memory devices and sensors may be attached without limitation. For power management, the main processor is preferably electrically connected to the solar array 18 which is connected to an exemplary battery charger 28. The battery charger 28 is preferably electrically connected to provide power to a rechargeable battery 22 via a battery protection circuit 30. The power management elements may preferably further include elements such as a buck converter 48 and a cell load switch 50. Inputs to control and monitor the status of various power elements may Preferably be provided by one or more status inputs 32. For data transmission, the main processor is preferably electrically interfaced with a BLE antenna 42 and or the like. The main processor is preferably further electrically interfaced with a cell module 44 which preferably is connected to one or more antennas such as a patch antenna 26 and a GNSS antenna 46. Although not shown, other elements such as a satellite transceiver and/or dedicated 802.11 Wi-Fi elements may also be used without limitation.

Figure 7:
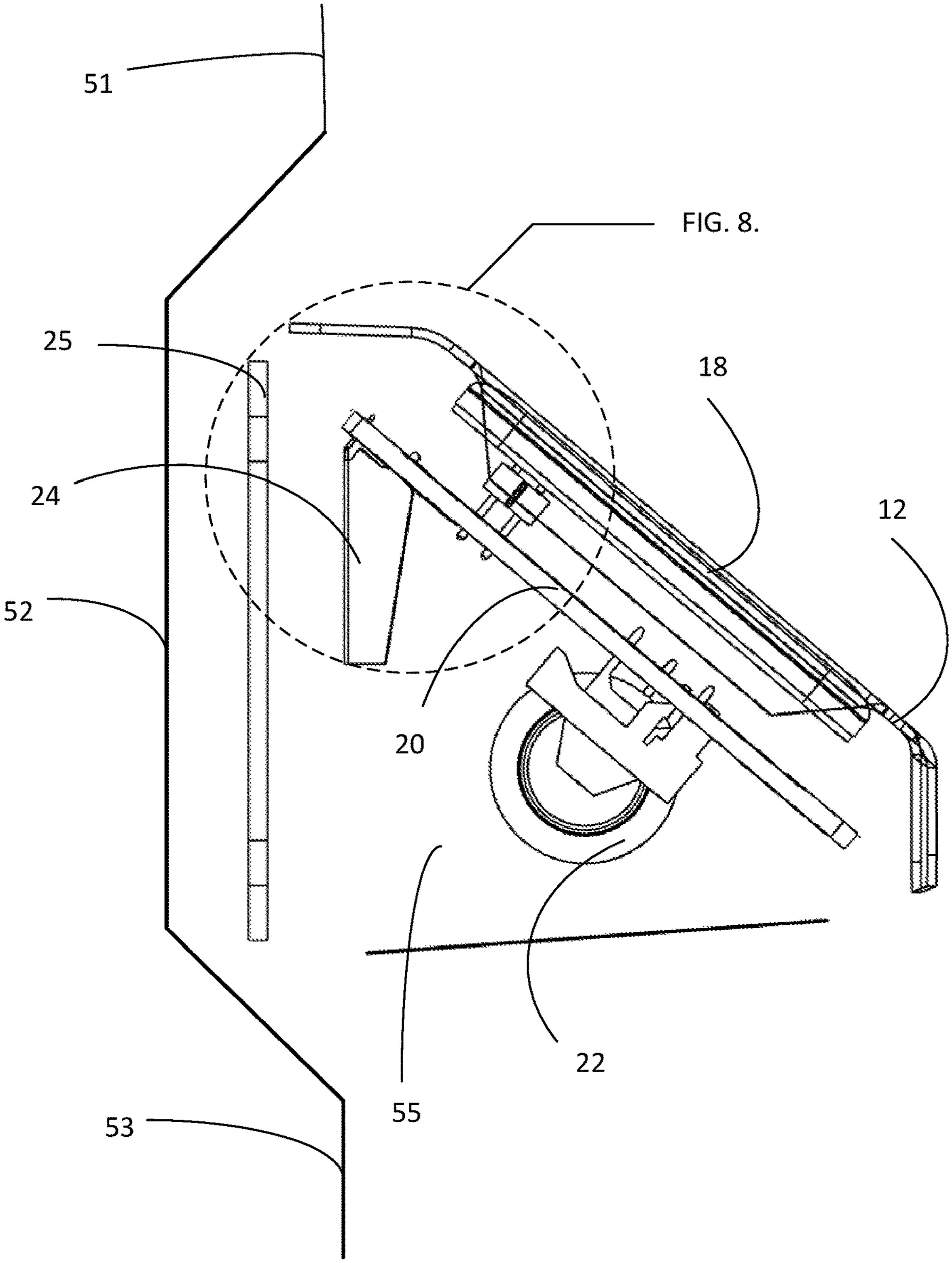
FIG. 7 is a side, cutaway view of the exemplary tracking device of the present invention.

FIG. 7 provides a side, cutaway view of the exemplary tracking device of the present invention. As shown in FIG. 7, the exterior housing 12 of the tracking device 10 preferably extends to length to fit within the standard rib openings of container wall corrugations (i.e., between the top corrugation flanges 51, 53 and/or within the bottom corrugation flanges 52 for the standard gauge corrugations of shipping container walls. In this way, the backwall surface 25 of the tracking device 10 preferably may sit flush against the bottom corrugation flange/surface 52. According to preferred alternative embodiments, the interior area 55 of the main housing 12 may preferably filled with polymer material (not shown) to provide both structural support and electrical insulation. According to a further preferred embodiment, the polymer material may itself extend to and function as a back surface of the tracking device 10 in place of the back wall surface 25 shown in FIG. 7. As further shown in FIG. 7, the backer plate assembly for 24 is preferably aligned with or substantially aligned with (+/−10 degrees) the main vertical axis of the bottom flange 52.

Figure 8:
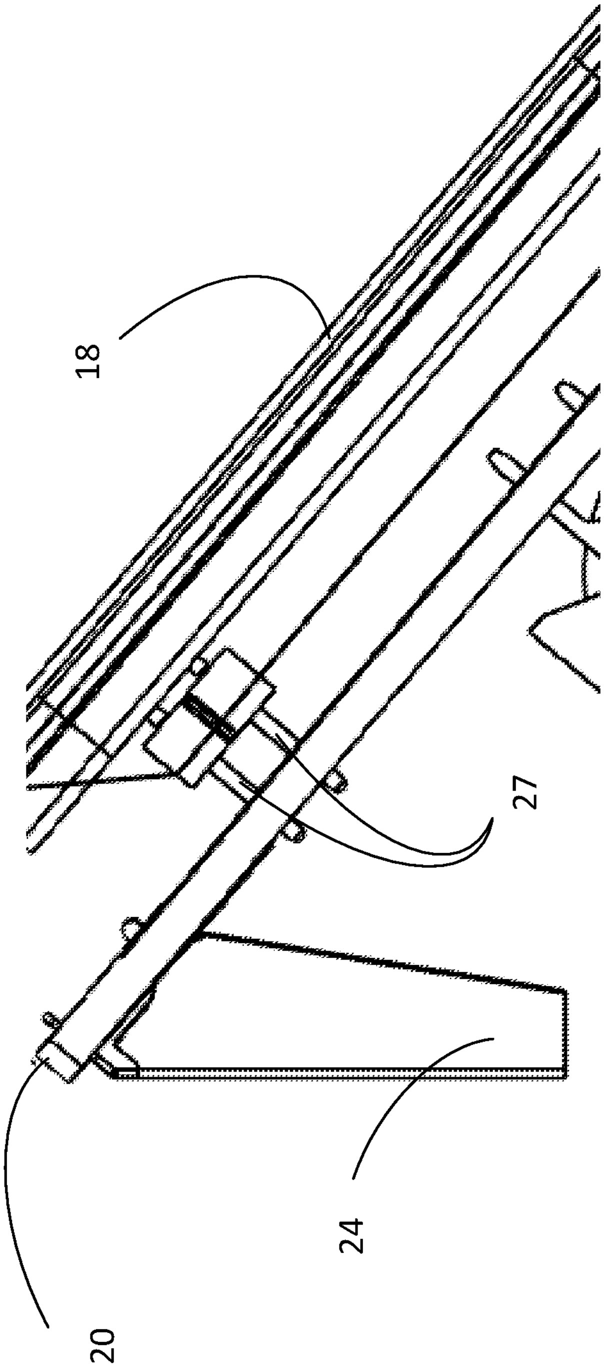
FIG. 8 is an enlarged view of the area indicated in FIG. 7.

Referring now to FIG. 8, the solar panel 18 may preferably be electrically connected to the main circuit board 20 via one or more electronic chokes 27 which are preferably tuned to remove selected RF frequencies transmitted/received by the patch antenna 26. In this way, the solar panel 18 may be understood to electrically "float" above the main circuit board 20 without interfering with the transmission quality of the patch antenna 26 or any other transmitter/receiver of the system.

Figure 9:
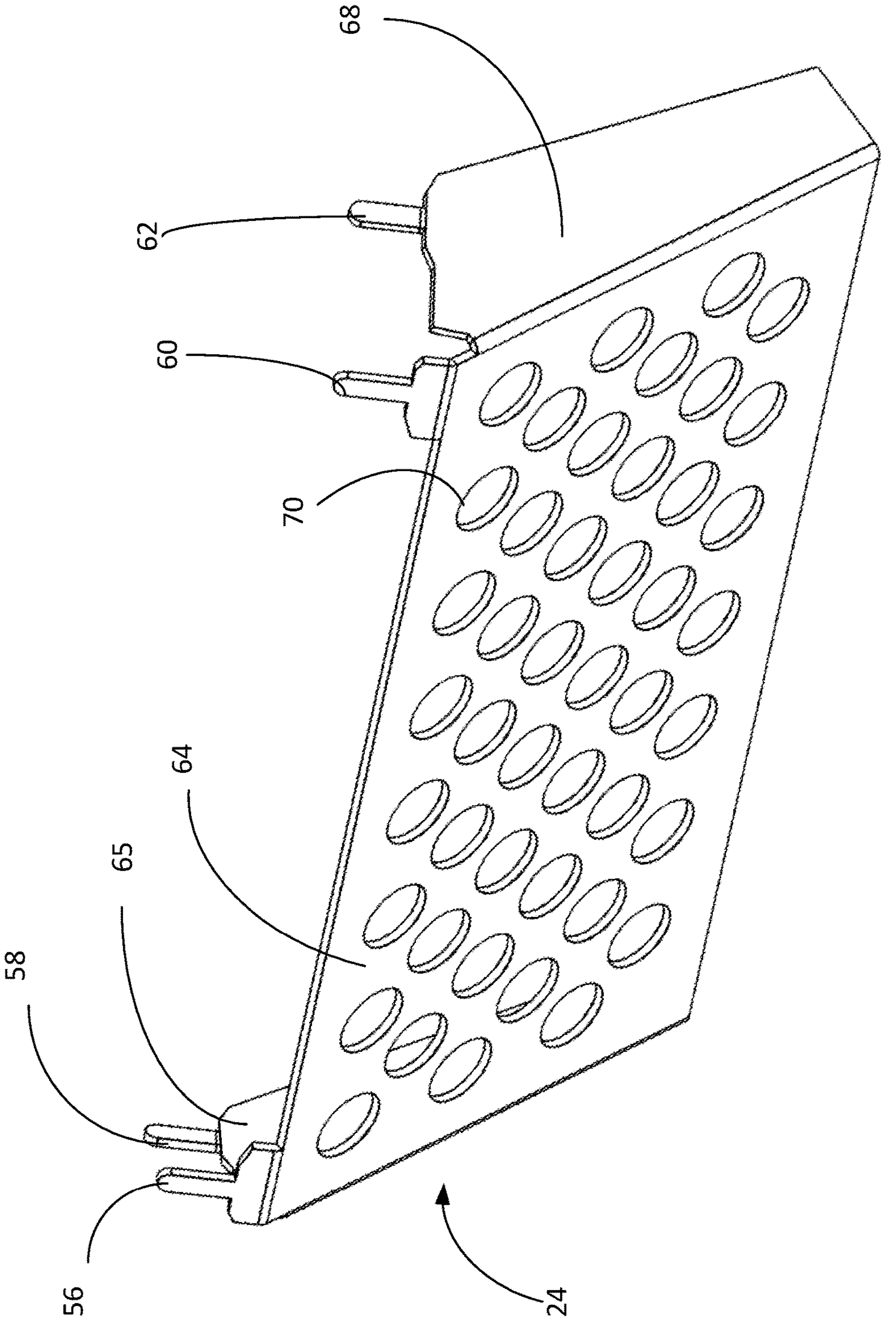
FIG. 9 is a perspective of the view of an exemplary backer plate assembly in accordance with the present invention.
Figure 10:
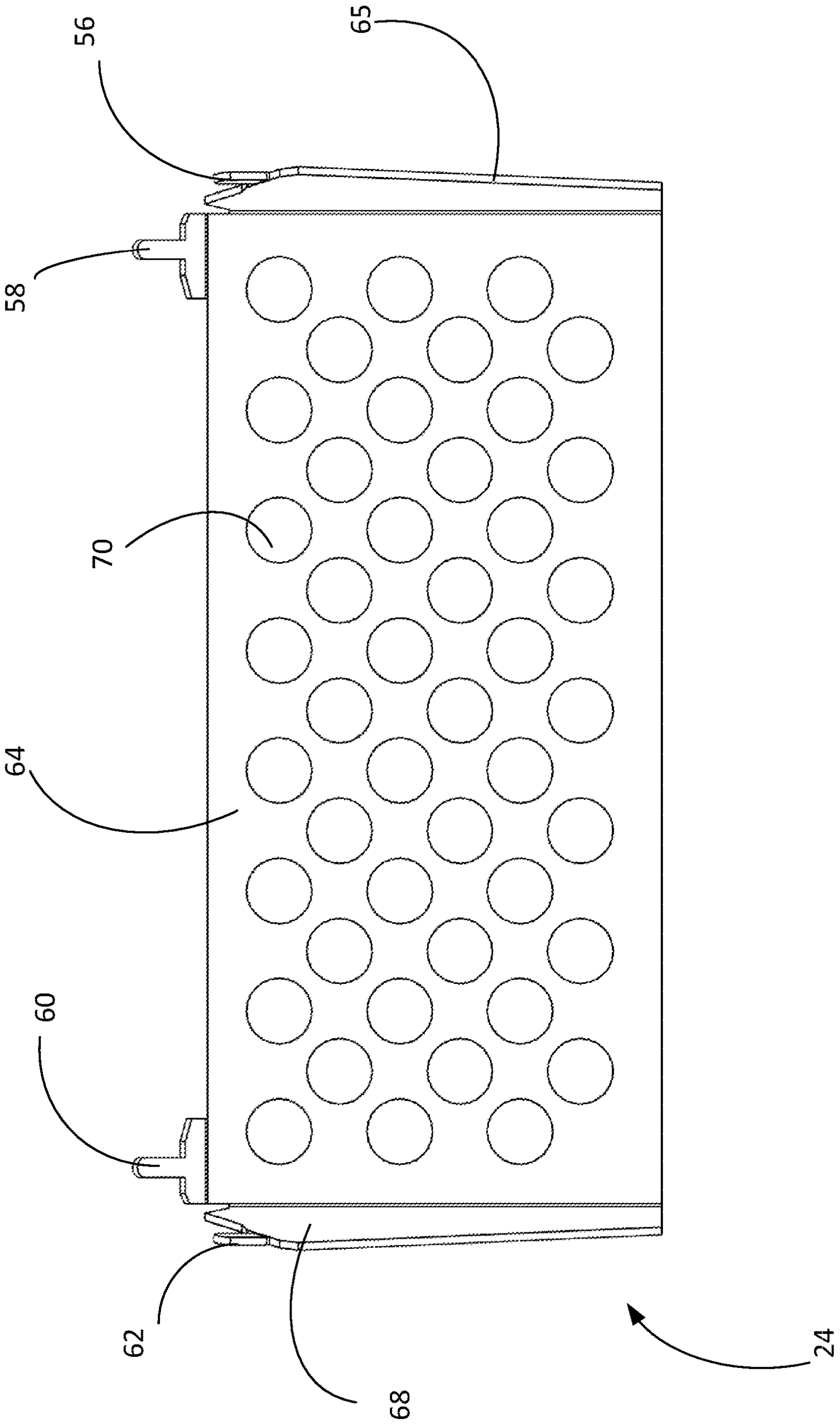
FIG. 10 is an elevation view of the backer plate assembly shown in FIG. 9.
Figure 11:
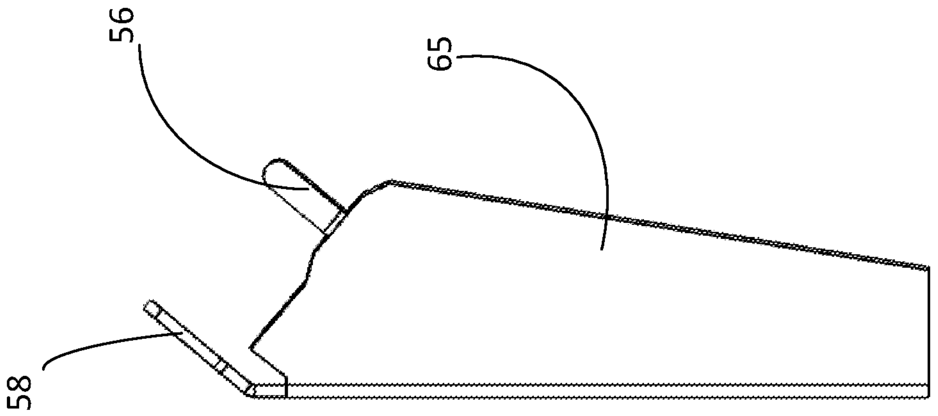
FIG. 11 is a side elevation view of the backer plate assembly shown in FIG. 9
Figure 12:
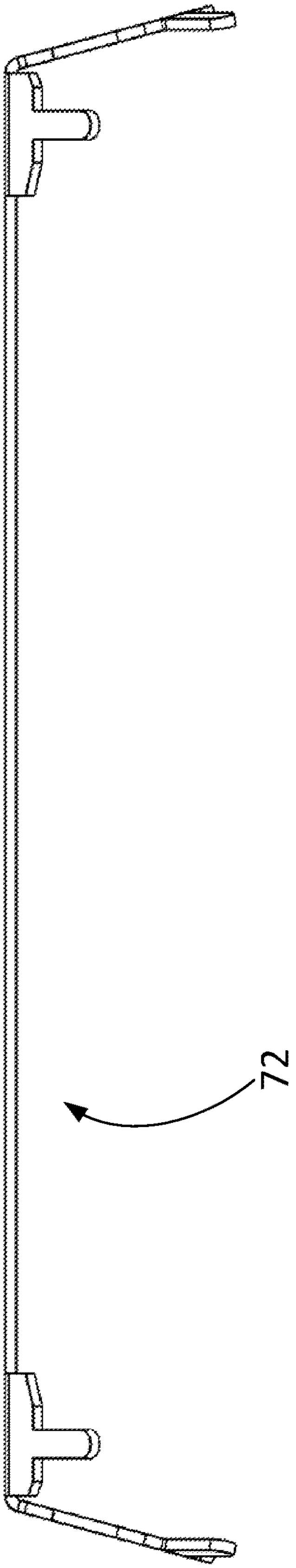
FIG. 12 is a top-down view of the example backer plate assembly shown in FIG. 9.
Figure 13:
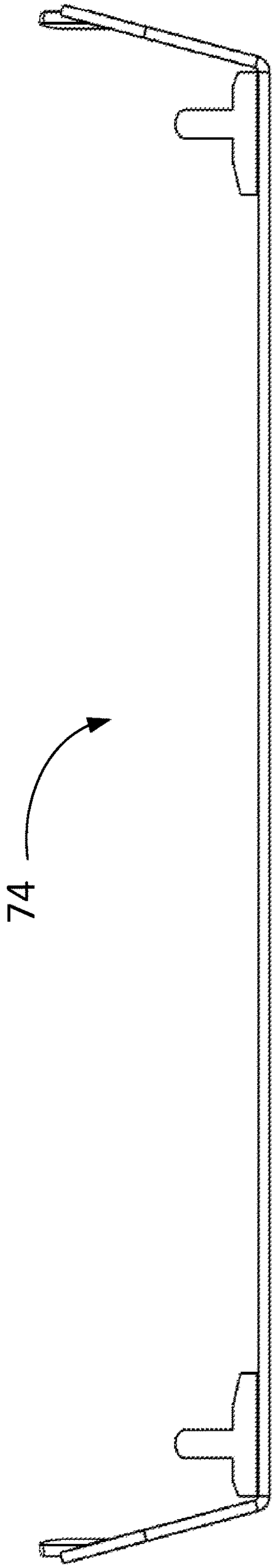
FIG. 13 is a bottom-up view of the example backer plate assembly shown in FIG. 9.

With preference now to FIGS. 9-13, an exemplary backer plate assembly 24 of the present invention shall now be discussed. FIG. 9 provides a perspective of the view of the exemplary backer plate assembly 24. exemplary backer plate assembly in accordance with the present invention. FIG. 10 is an elevation view of the backer plate assembly and FIG. 11 provides a side elevation view of the same. FIGS. 12 and 13 provide top-down 72 and bottom up 74 views, respectively. As shown, the exemplary backer plate 24 preferably maybe formed with a main front face and side wings 65, 68. One or more connector pins 56, 58, 60, 62 or preferably further provided to physically and electrically connect the backer plate to the patch antenna 26 of the main circuit board 20. As further shown, the main face 64 of the backer plate 24 preferably includes a number of perforations/holes 70.

While the invention has been illustrated and described as embodied in a particular imaging system, it is not intended to be limited to the details shown, since it will be understood that various omissions, modifications, substitutions and changes in the forms and details of the device illustrated and, in its operation, can be made by those skilled in the art without departing in any way from the spirit of the present invention. The scope of the present invention should be determined not by the embodiments illustrated, but by the appended claims and their legal equivalents.

What is claimed is:

1. A tracking device comprising:

a plurality of securing wings, wherein the securing wings are configured to attach the tracking device to an external surface;

a main circuit board;

a patch antenna, wherein the patch antenna is electrically connected to the main circuit board;

a main housing, wherein the main housing comprises a front face, wherein the front face extends out from a main horizontal plane of the tracking device, wherein the main housing comprises a first opening; and a solar panel array, wherein the solar panel array inserts within the first opening, wherein the solar panel array is electrically connected to the main circuit board by at least one electronic choke, wherein the electronic choke is tuned to remove selected RF frequencies transmitted/received by the patch antenna.

* * * * *